US006574478B1

(12) United States Patent
Mortensen

(10) Patent No.: US 6,574,478 B1
(45) Date of Patent: Jun. 3, 2003

(54) SYSTEM AND METHOD FOR LOCATING MOBILE DEVICES

(75) Inventor: Duane Mortensen, Lucas, TX (US)

(73) Assignee: Alcatel USA Sourcing, L.P.

(*) Notice: Subject to any disclaimer, the term of this patent is extended or adjusted under 35 U.S.C. 154(b) by 0 days.

(21) Appl. No.: 09/637,382

(22) Filed: Aug. 11, 2000

(51) Int. Cl.⁷ ............................................. H04Q 7/20
(52) U.S. Cl. ................... 455/456; 455/502; 455/11.1; 455/16
(58) Field of Search ........................... 455/404, 423, 455/427, 440, 450, 456, 11.1, 13.1, 15, 16, 18, 21, 24, 500, 507, 517, 92, 95, 502; 379/127; 375/356; 370/503; 342/357.1, 357.12, 463, 465, 464

(56) References Cited

U.S. PATENT DOCUMENTS

| 5,327,144 | A |   | 7/1994  | Stilp et al. ............... 342/387 |
| 5,600,706 | A |   | 2/1997  | Dunn et al. ............... 379/59 |
| 5,758,288 | A |   | 5/1998  | Dunn et al. ............... 455/456 |
| 5,835,530 | A |   | 11/1998 | Hawkes ................... 375/225 |
| 5,835,907 | A | * | 11/1998 | Newman .................. 707/10 |
| 5,952,960 | A |   | 9/1999  | Lennen .................. 342/357.01 |
| 5,987,329 | A |   | 11/1999 | Yost et al. ............... 455/456 |
| 6,014,102 | A |   | 1/2000  | Mitzlaff et al. ........... 342/457 |
| 6,021,330 | A |   | 2/2000  | Vannucci ................. 455/456 |
| 6,026,304 | A |   | 2/2000  | Hisenrath et al. ......... 455/456 |
| 6,028,551 | A |   | 2/2000  | Schoen et al. ........... 342/357.16 |
| 6,040,800 | A |   | 3/2000  | Raith et al. .............. 342/387 |
| 6,108,558 | A | * | 8/2000  | Vanderspool, II ......... 455/456 |
| 6,122,512 | A | * | 9/2000  | Bodin ..................... 455/440 |
| 6,163,278 | A | * | 12/2000 | Janman ................... 340/988 |
| 6,236,337 | B1| * | 5/2001  | Beier ..................... 340/905 |
| 6,243,587 | B1| * | 6/2001  | Dent ...................... 455/456 |
| 6,246,361 | B1| * | 6/2001  | Weill ..................... 342/357.01 |

* cited by examiner

Primary Examiner—Vivian Chin
Assistant Examiner—John J Lee
(74) Attorney, Agent, or Firm—Anderson, Levine & Lintel; V. Lawrence Sewell; Jessica W. Smith

(57) ABSTRACT

A system for locating one of a plurality of mobile communications devices is provided. A transmitter (24) transmits a first signal (S1), with the first signal having a device identification code for identifying a particular mobile communications device to be located and a time indicator. Retransmission circuitry (40, 60) in the selected mobile communications device (20) receives the first signal and transmits a second signal (S2) in response thereto. Each of a plurality of receivers (22) has an internal clock. When the first signal is received, these clocks are set based on the time indicator in the first signal. When the second signal is received, a time difference between the first signal and second signal is determined. Network control circuitry (26) determines the location of the particular mobile communications device responsive to time differences determined by multiple receivers.

16 Claims, 4 Drawing Sheets

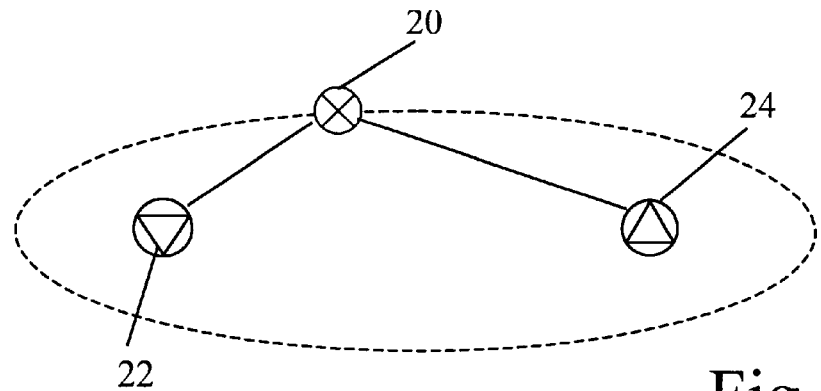
Fig. 4a
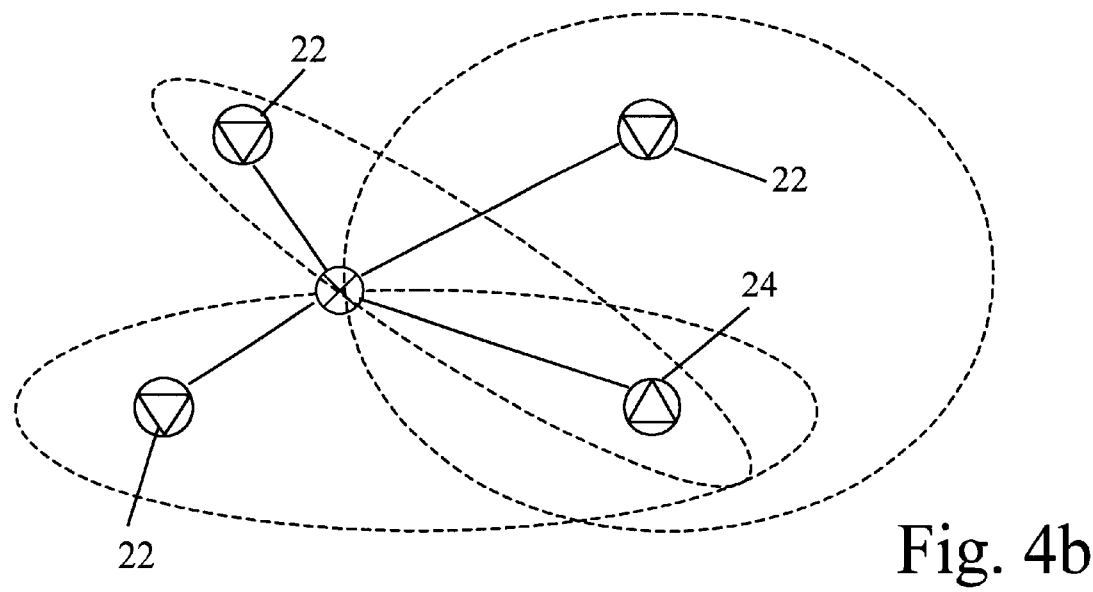
Fig. 4b
Fig. 4c
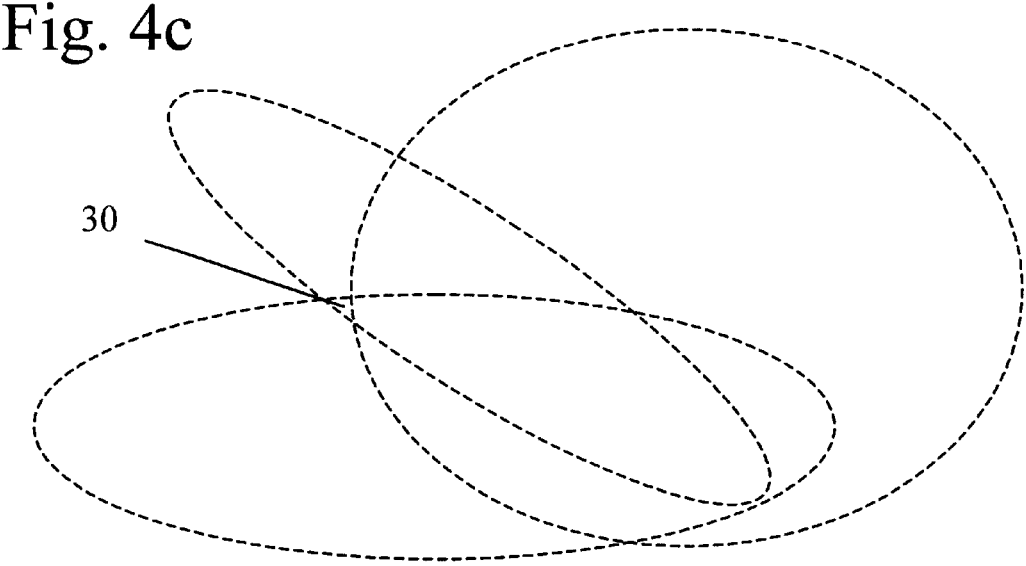

SYSTEM AND METHOD FOR LOCATING MOBILE DEVICES

STATEMENT OF FEDERALLY SPONSORED RESEARCH OR DEVELOPMENT

Not Applicable

CROSS-REFERENCE TO RELATED APPLICATIONS

Not Applicable

BACKGROUND OF THE INVENTION

1. Technical Field

This invention relates in general to telecommunications and, more particularly, to a system and device for locating a mobile transceiver.

2. Description of the Related Art

Mobile communications has demonstrated enormous growth over the last decade. Whereas mobile communications was once limited to critical phone calls in situations where wireline communications did not exist, many people now use mobile communications as their primary means of communicating. Further, many present day mobile communications include processing capabilities, such as PDAs (personal digital assistants), hand-held computers, notebook computers, and other devices. Some pagers also have two way communication capabilities.

At times, it is desirable to locate a mobile communication device with some precision. An obvious example of an application where mobile locating services are beneficial is in connection with emergency (i.e., 911) services. In emergency situations, the user of a mobile device may be unaware or his or her location, or in a stressed state where he or she is confused about the present location. This can result in critical emergency services, such as police, fire and ambulance services, being sent to a wrong location.

Other services may also need location information for optimal efficiency. For example, a company may provide "roadside assistance" or "concierge" services to customers for a fee. These services could provide directions to the nearest gas station, towing services, directions and so on for users of mobile devices. To effectively administer the services, it will be desirable to have fairly accurate information on the user's location.

One solution would be to provide a GPS (global positioning system) device in each phone, which could send location information as part of a request for services. While a GPS device can produce extremely accurate location information, it requires clear reception of signals from multiple satellites. Typically, the satellite signals cannot be accurately received while the mobile communications device is within a building, or while tall buildings surround the mobile communications device. Accordingly, the GPS location services will be inoperable in many circumstances where they are needed the most.

A number of solutions use triangulation to determine the location based on a transmission from the mobile device. These solutions include TOA (time of arrival) and TDOA (time difference of arrival) techniques. Time synchronization is of particular importance for the receivers (typically, base stations) receiving the signal, since even small variations (as low as tens of nanoseconds) can cause substantial inaccuracies in the resultant location calculation.

Therefore, a need has arisen in the industry for a highly accurate method and apparatus for determining the location of a mobile communications device.

BRIEF SUMMARY OF THE INVENTION

In the present invention, a system for locating one of a plurality of mobile communications devices is provided. A transmitter transmits a first signal, with the first signal having a device identification code for identifying a particular mobile communications device to be located and a time indicator. Circuitry in each of the mobile communications devices receives the first signal and transmits a second signal in response to a match between the identification code of the first signal and an internal identification code. Each of a plurality of receivers has an internal clock: When the first signal is received, these clocks are set based on the time indicator in the first signal. When the second signal is received, a time difference between the first signal and second signal is determined. Control circuitry determines the location of the particular mobile communications device responsive to time differences determined by multiple receivers.

The present invention provides significant advantages over the prior art. First, extremely accurate location information can be derived. Second, the signals may be transmitted using conventional technology usable within buildings. Third, the effect of propagation delays within the receiver is eliminated. Fourth, only three receivers are needed to unambiguously locate the mobile communications device, although more receivers may provide greater accuracy.

BRIEF DESCRIPTION OF THE SEVERAL VIEWS OF THE DRAWINGS

For a more complete understanding of the present invention, and the advantages thereof, reference is now made to the following descriptions taken in conjunction with the accompany drawings, in which:

FIG. 4a is a diagram illustrating possible locations of the mobile device relative to a single receiver using the present invention;

FIG. 4b is a diagram illustrating the intersection of three sets of possible locations according to FIG. 4a;

FIG. 4c is a diagram illustrating the intersection of three sets of possible locations according to FIG. 4a, where an unexpected delay is encountered;

DETAILED DESCRIPTION OF THE INVENTION

The present invention is best understood in relation to FIGS. 1–6 of the drawings; like numerals being used for like elements of the various drawings.

Figure 1:
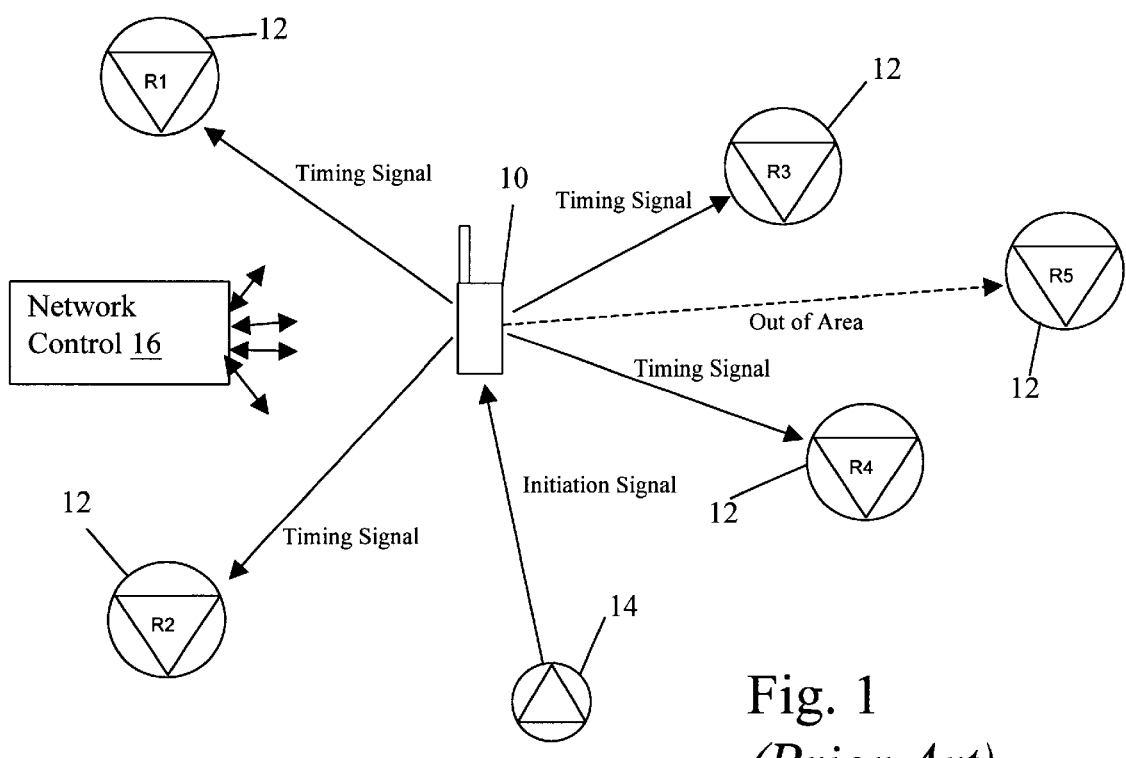
FIG. 1 illustrates a diagram of a prior art technique for locating a mobile communications device.

FIG. 1 illustrates a prior art technique for locating a mobile communications device 10. A plurality of receivers 12, typically base stations, are in the general vicinity of the mobile communications device 10. A transmitter 14, which can also be located in a base station, operates in the general vicinity of the mobile communications device 10. Network control 16 is coupled to the receivers 12 and transmitter 14.

In operation, the network must synchronize itself or use outside sources for synchronization (i.e., GPS clocks). As will be discussed in greater detail below, it is important that the receivers are time-synchronized. When the transmitter 14 receives a command from network control 16 to locate a mobile communications device 10, the transmitter 14 issues a signal (the "initiation signal") identifying the particular mobile communications device 10 being located. This signal is also received by receivers 12. The mobile communications device 10 identified by the signal will broadcast a signal (the "timing signal") in response to the initiation signal. Alternatively, information such as call setup, framing information, or other overhead could be used to start the triangulation.

The mobile communications device 10 has an output of limited range. Some of the receivers 12 will detect the timing signal (R1–R4 in the illustration of FIG. 1), whereas other receivers will not (R5 in the illustration of FIG. 1). Each receiver 12 that receives the signal will detect the time at which the signal was received. If the time of reception of the timing signal is beyond a time threshold from the reception of the initiation signal, the timing signal is invalid.

Each receiver 12 stores a value indicative of the time that the timing signal was received, based on each receiver's internal clock. Assuming that the timing signal is valid, the time of reception from each receiver 12 is used to calculate the location of the mobile communications device 10. Because the origination time of the location pulse is generally not known to an accuracy required for location determination, a TDOA approach is normally used. Using the technique, the differences in time of arrival between receivers 12 are used in the triangulation calculation. Accordingly, triangulation is performed using $T_{1-2}$, $T_{1-3}$ and $T_{1-4}$, where $T_{x-y}$ is the difference in the reception of the timing signal between receivers $R_x$ and $R_y$.

The system for locating the mobile communications device 10 described above has several shortcomings. First, the transmitters 14 and receivers 12 in the network must be highly synchronized. The time of day clock for all receivers must be synchronized to within tens of nanoseconds for accurate location of the mobile communications device 10. Second, the mobile communications device 10 is responsible for generating the timing signal in response to identifying an initiation signal, thus requiring extra functionality on each mobile communications device 10. Third, in order to obtain at least three triangulation points, four receivers 12 must receive valid timing signals. This diminishes the effective range of the network, since receivers will not be as closely spaced outside of metropolitan areas. Fourth, delays in each receiver, due to the antenna, cable, and internal components, will vary from receiver to receiver. These delays can affect the time stamp associated with receiving the timing signal and, hence, must be accounted for and normalized out. Again, errant calculations of the delays in the range of tens of nanoseconds can significantly affect the accuracy of the location calculation.

Figure 2:
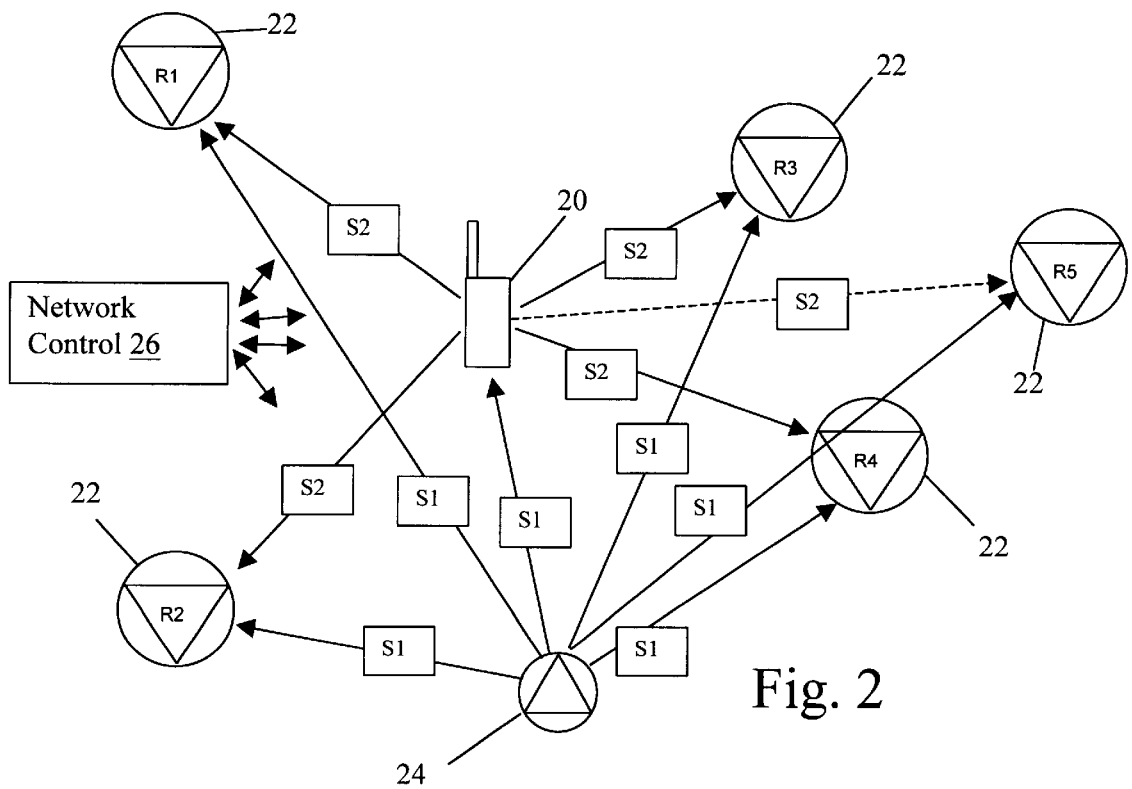
FIG. 2 is a diagram of a communications system with location services having auto-synchronization capabilities.

FIG. 2 illustrates an improved location apparatus and method for locating a mobile communications device 20. Once again, a plurality of receivers 22, typically base stations, are in the general vicinity of the mobile communications device 20. A transmitter 24, which can also be located in a base station, is also in the general vicinity of the mobile communications device 20. Network control 26 is coupled to the receivers 22 and transmitter 24.

To locate a mobile communications device 20, network control 26 commands transmitter 24 to generate a first signal S1, which contains a time stamp and an identifier unique to a single mobile communications device 20. This signal is broadcast to the mobile communications devices 20 and the receivers 22 in the vicinity of the transmitter 24. Each receiver 24 that receives signal S1 uses the S1 signal to set its internal clock to the time indicated in the time stamp. For greatest accuracy, each receiver 22 compensates for the distance between the transmitter 24 and the receiver 22, which is fixed and known. Accordingly, all receivers 22 in the vicinity will automatically be synchronized with each S1 signal to a high degree.

The same signal, S1, is received by the mobile communications devices 20, one of which will be identified by signal S1 (if it is in the broadcast area of the transmitter 24). The identified mobile communications device 20, upon receiving signal S1, rebroadcasts the signal as signal S2. Receivers 22 in the broadcast area of the mobile communications device 20 receive the rebroadcast signal S2. In the illustrated embodiment of FIG. 2, Receivers R1 through R4 receive the rebroadcast signal, while receiver R5 is out of the range of the mobile communications device 20.

Figure 3:
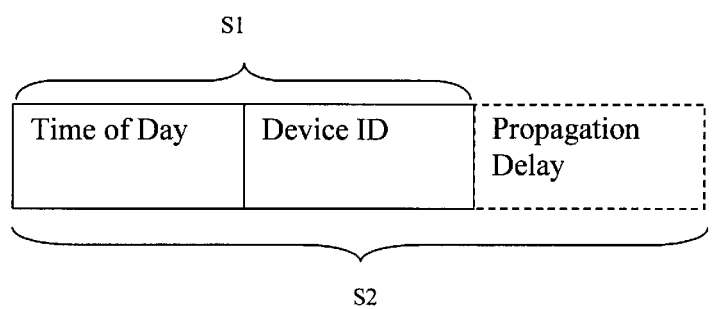
FIG. 3 is a representation of a signal used to locate a desired mobile communications device.

The rebroadcast signal S2 may take several forms. In a first embodiment, the mobile communications device 20 receives signal S1 at a first frequency and immediately broadcasts the signal at a second frequency as signal S2. In a second embodiment, the mobile communications device 20 receives signal S1 and sends signal S2 at the same frequency. The mobile communications device 20 may also add information to the signal, such as a value indicative of the propagation delay through the electronics of the mobile communications device 20, as shown in FIG. 3.

The receivers 22 receive signal S2 and note the time that signal S2 was received, based on the internal clock which was set in accordance to signal S1. The time from the signal to travel from the transmitter 24 to a given receiver is thus $T_{S2}-T_{S1}$, where $T_{S1}$ is the time that the S1 signal was received and $T_{S2}$ is the time that the S2 was received.

It should be noted that any propagation delay in the receiver between receiving the S1 or S2 signal and storing the time of receipt is eliminated in determining the difference $T_{S2}-T_{S1}$.

As shown in FIG. 4a, the time differential, $T_{S2}-T_{S1}$, indicates the distance between the transmitter 24 and the mobile communications device 20, plus the distance between the mobile communications device 20 and the receiver 22. With the locations of the transmitter 24 and receiver 22 being fixed and known, the possibilities for a given time differential can be defined as an ellipse, with the transmitter 24 and receiver 22 as foci. Network control 26 can use this information to pinpoint the location of the mobile communications device 20.

If three receivers 22 are close enough to the transmitter 24 and the mobile communications device 20 to receive the S1 and S2 signals, three ellipses may be defined, corresponding to the location of the transmitter 24, receiver 22 and the distance defined by $T_{S2}-T_{S1}$. As shown in FIG. 4b, the three ellipses will intersect at the location of the mobile communications device 20.

It should be noted that the ellipses do not need to intersect exactly for an accurate location determination. If, for example, an unaccounted-for delay through the mobile communications device 20 causes the ellipses to be enlarged, as shown in FIG. 4c, creating an area 30 between three points of intersection between the ellipses, a least squares determination of the center of the area 30 can closely approximate the location of the mobile communications device 20.

Further, with less than two receivers having valid data, the location of the mobile communication device 20 may be located in one of two points of intersection. Using other information, such as information from the user, maps, or angle of arrival, the ambiguity may be resolved.

Figure 5:
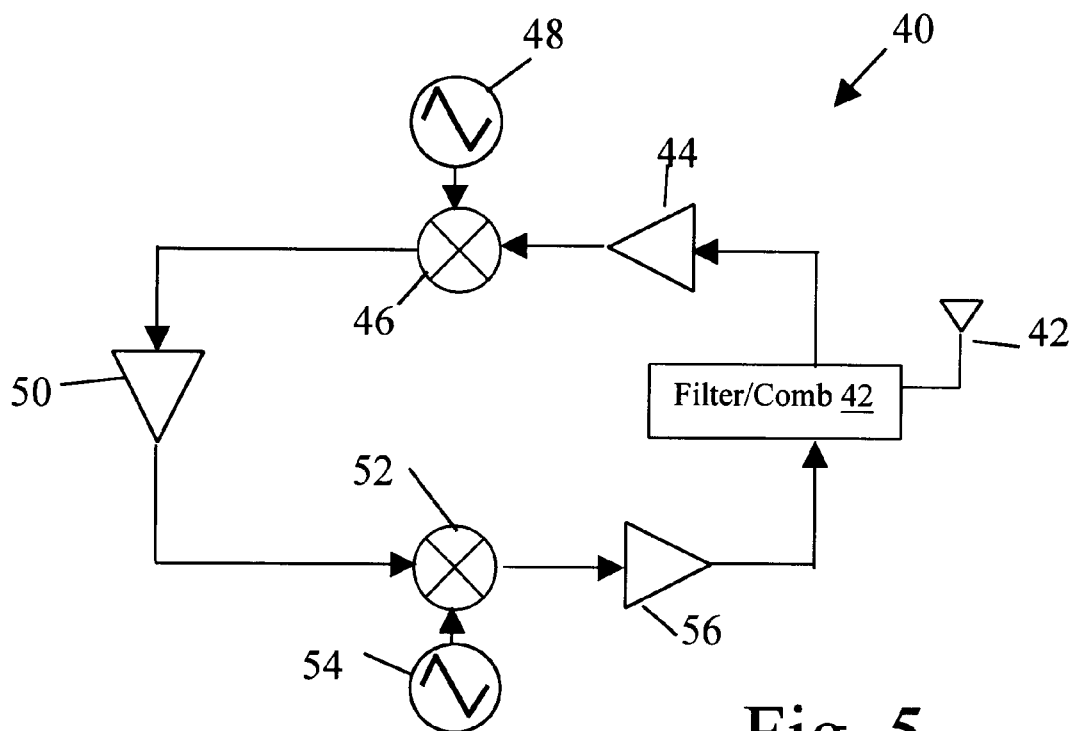
FIG. 5 illustrates a frequency-shifting circuit.

As stated above, the S2 signal may be a repeated version of the S1 signal at a different frequency, or the S2 signal may be received and retransmitted at the same frequency. Shifting the S1 signal to a different frequency can be performed with very little time delay through a simple circuit as shown in FIG. 5. In this embodiment, the mixing circuit 40 is provided in the mobile communications device 20. Mixing circuit 40 receives the S1 signal from the transmitter 22 through antenna 42. Filter/combiner 43 isolates the signal from any signal being simultaneously output and passes the signal for further conditioning through filter/amplifier 44. The output of filter/amplifier 44 is input to mixer 46 along with the output of oscillator 48, which shifts the frequency of the S1 signal to a desired intermediate frequency (IF). The IF signal is passed through bandpass filter 50. The output of bandpass filter 50 is received by mixer 52, along with the output of oscillator 54, which further shifts the frequency to the desired second frequency.

Figure 6:
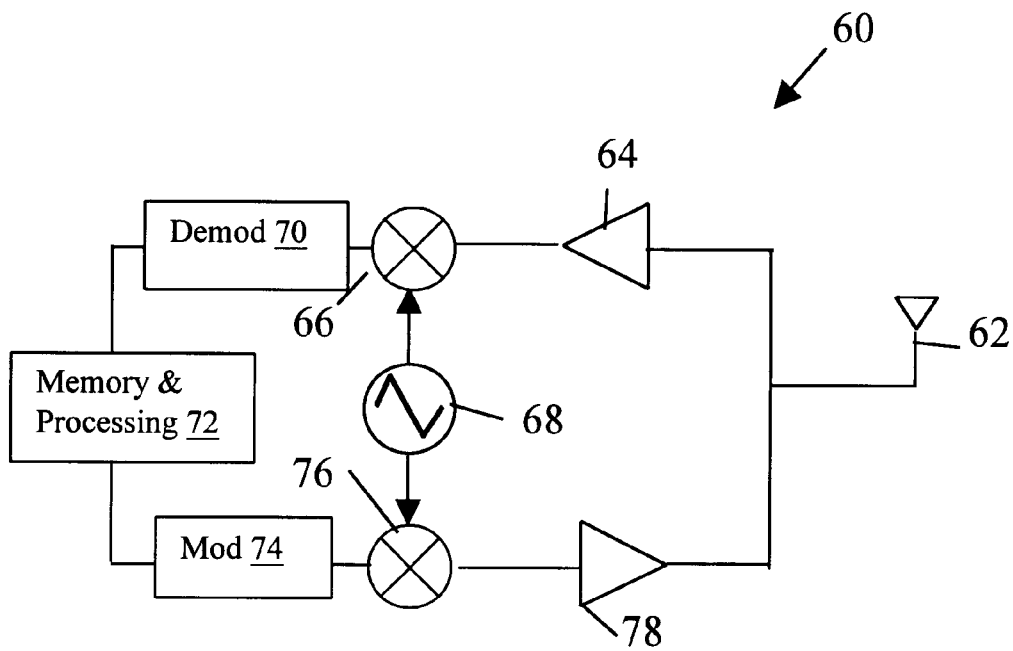
FIG. 6 illustrates a circuit for re-broadcasting a signal at a common frequency.

FIG. 6 illustrates a circuit for receiving the S1 signal and sending the S2 signal at the same frequency. In this embodiment, the S1 signal is received from transmitter 24 through antenna 62. The S1 signal is conditioned through filter/amplifier 64. The output of filter/amplifier 64 is received by mixer 66 along with the output of oscillator 68, which translates the S1 signal to a desired intermediate frequency. The IF signal is demodulated in demodulator 70 into binary form. The demodulated bits are stored in memory/processing circuit 72, which adds any desired additional data to the signal. The data for signal S2 is output from memory/processing circuit 72 to modulator 74. The output of modulator 74 is translated to the original frequency of signal S1 by mixer and oscillator 68. The S2 signal is then amplified and transmitted using antenna 62.

Demodulating the signal from the transmitter and re-modulate the signal requires a significant delay within the mobile communications device 20. Therefore, it is desirable to add information regarding the delay through the mobile communications device 20 (which may vary between different mobile communications devices) to provide in a more accurate measurement of the time the signal travels from transmitter 24 to mobile communications device 20 to receiver 22. The time period is then calculated as $T_{S2}-T_{S1}-T_d$, where $T_d$ is the delay through the mobile communications device 20.

The present invention provides significant advantages over the prior art. First, extremely accurate location information can be derived. Second, the signals may be transmitted using convention technology usable within buildings. Third, propagation delays within the receiver are eliminated. Fourth, only three receivers are needed to locate the mobile communications device 20, although more receivers may provide greater accuracy.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

What is claimed is:

1. A system for locating one of a plurality of mobile communications devices, comprising:

a transmitter for transmitting a first signal, the first signal having a device identification code for identifying a particular mobile communications device to be located and a time indicator;

retransmission circuitry in each of the mobile communications devices for receiving the first signal and transmitting a second signal in response to a match between said identification code of said first signal and an internal identification code;

a plurality of receivers having respective internal clocks for receiving the first signal and setting their respective internal clocks based on the time indicator in the first signal, receiving the second signal, and determining a time difference between said first and second signals; and control circuitry for determining the location of the particular mobile communications device responsive to time differences determined by multiple receivers.

2. The system of claim 1 wherein said first signal is transmit at a first frequency and said retransmission circuitry transmits said second signal at a second frequency different from said first frequency.

3. The system of claim 2 wherein said retransmission circuitry comprises a frequency shifter for shifting the frequency of said first signal to produce said second signal.

4. The system of claim 1 wherein said first signal is transmit at a first frequency and said retransmission circuitry transmits said second signal at said first frequency.

5. The system of claim 4 wherein said retransmission circuitry includes demodulation circuitry and modulation circuitry.

6. The system of claim 5 wherein said retransmission circuitry includes memory for temporarily storing data from said first signal.

7. The system of claim 1 wherein said retransmission circuitry includes circuitry for adding information to said first signal.

8. The system of claim 7 wherein said retransmission circuitry adds information indicative of a propagation delay associated with the mobile communication device.

9. A method for locating one of a plurality of mobile communications devices, comprising:

transmitting a first signal, the first signal having a device identification code for identifying a particular mobile communications device to be located and a time indicator;

receiving the first signal in the mobile communications devices;

transmitting a second signal from one of the mobile communications devices in response to a match between said identification code of said first signal and an internal identification code;

receiving the first signal in a plurality of receivers having respective internal clocks and setting the respective internal clocks based on the time indicator in the first signal;

receiving the second signal in said receivers;

determining a time difference between reception of said first and second signals; and determining the location of the particular mobile communications device responsive to time differences determined by multiple receivers.

10. The method of claim 9 wherein said step of transmitting said first signal comprises transmitting a first signal at a first frequency and said step of transmitting said second signal comprises the step of transmitting said second signal at a second frequency different from said first frequency.

11. The method of claim 10 wherein said step of transmitting a second signal at a second frequency comprises the step of shifting the frequency of said first signal to produce said second signal.

12. The method of claim 9 wherein said step of transmitting said first signal comprises transmitting a first signal at a first frequency and said step of transmitting said second signal comprises the step of transmitting said second signal at said first frequency.

13. The method of claim 12 wherein said step of transmitting said second signal includes the steps of demodulating said first signal to generate data and modulating said data at said first frequency.

14. The method of claim 13 wherein said step of transmitting said second signal comprises the step of storing said data in a memory.

15. The method of claim 9 wherein said step of transmitting said second signal includes the step of adding information to said first signal.

16. The method of claim 15 wherein said step of adding information comprises the step of adding information indicative of a propagation delay associated with the mobile communication device.

\* \* \* \* \*